United States Patent [19]

Spencer

[11] 4,036,302
[45] July 19, 1977

[54] HORSESHOE MANUFACTURE

[76] Inventor: Dudley W. C. Spencer, 619 Skipley Road, Wilmington, Del. 19801

[21] Appl. No.: 673,371

[22] Filed: Apr. 5, 1976

Related U.S. Application Data

[63] Continuation-in-part of Ser. No. 614,766, Sept. 18, 1975, Pat. No. 4,013,126, which is a continuation-in-part of Ser. No. 426,446, Dec. 20, 1973, Pat. No. 3,917,000, which is a continuation-in-part of Ser. No. 71,121, Sept. 10, 1970, Pat. No. 3,664,428.

[51] Int. Cl.² .............................................. A01L 3/00
[52] U.S. Cl. ........................................... 168/4; 168/17
[58] Field of Search ........................... 168/1, 4, 12–16, 168/17, 28; 24/143 R; 428/230, 231, 234, 235, 236, 225, 226; 57/140 R, 140 BY

[56] References Cited

U.S. PATENT DOCUMENTS

| 1,129,244 | 2/1915 | Stanicci | 168/14 |
| 2,429,486 | 10/1947 | Reinhardt | 428/235 |
| 2,996,872 | 8/1961 | Porczynski | 57/140 BY |
| 3,241,214 | 3/1966 | Smith et al. | 428/234 |
| 3,366,529 | 1/1968 | Olson | 428/85 |
| 3,535,192 | 10/1970 | Gamble | 428/95 |
| 3,581,353 | 6/1971 | Sonntag | 24/143 R |

Primary Examiner—Louis G. Mancene
Assistant Examiner—Peter K. Skiff
Attorney, Agent, or Firm—Connolly and Hutz

[57] ABSTRACT

A horseshoe is applied to the hoof by means of elongated strands or laces which are adhesively secured to the shoe after being threaded through holes in the hoof. The laces have a breaking strength less than that of the strength of the horse's hoof. The horseshoe itself includes a pad having a barrier sheet with loops on one side thereof integrally secured to the body member of the shoe, while loops on the other side provide means to facilitate adhesive securement to the hoof.

23 Claims, 6 Drawing Figures

HORSESHOE MANUFACTURE

CROSS-REFERENCE TO RELATED APPLICATIONS

This application is a continuation-in-part of copending application Ser. No. 614,766; filed Sept. 18, 1975, now U.S. Pat. No. 4,013,126 which in turn is a continuation-in-part of Ser. No. 426,446, filed Dec. 20, 1973 now U.S. Pat. No. 3,917,000, said patent being a continuation-in-part of Ser. No. 71,121, filed Sept. 10, 1970, now U.S. Pat. No. 3,664,428.

BACKGROUND OF THE INVENTION

Parent applicaton Ser. No. 614,766 relates to horseshoe manufacture wherein a horseshoe is secured to the hoof with the aid of elongated strands threaded through holes in the hoof and adhered to the hoof itself. The horseshoe assembly further includes a pad connected to the main body of the horseshoe. The pad provides a means to facilitate adhesive securement thereof to the main body and the hoof.

SUMMARY OF THE INVENTION

An object of this invention is to provide improvements in horseshoe manufacturing based upon the concepts set forth in the parent application.

A further object of this invention is to provide strand or lace structure particularly adaptable to such manufacturing techniques.

A still further object of this invention is to provide pad structure likewise particularly adaptable to such horseshoe manufacturing techniques.

In accordance with this invention the lace material is selected to have a breaking strength less than the strength of the horse's hoof. Thus any pulling on the lace will result in the lace breaking before damage occurs to the hoof. A preferred breaking strength is 1,000 lbs. or less and preferably at least 20 lbs.

The lace is preferably of a flexible, non-toxic, impervious, absorptive material. The lace may be made of a multiplicity of individual strands and may take the form of knits, braids or may be flocked and may have any suitable geometric cross-sectional shape such as round, flat, or oval. In a preferred form of this invention the ends of the lace are hard tipped such as by fusing the strand material itself or by applying rigid tubes thereto.

The pad or insert is advantageously made from an extensible carrier sheet which can conform to irregularities in shape without wrinkling. Fibers are directly connected to the carrier sheet such as by looping the fibers therethrough thus providing a multiplicity of loops on each side thereof. The carrier sheet may then be heat treated to seal the punctures made by the fibers to thus act as an effective barrier for confining the adhesive to its respective side of the carrier sheet.

THE DRAWINGS

DETAILED DESCRIPTION

The description in parent application Ser. No. 614.766; filed Sept. 18, 1975; and its parents patents 3.917,700 and 3,666,428 are incorporated herein by reference thereto. The following description will be directed primarily to amplifications of or departures from said descriptions.

Figure 4:
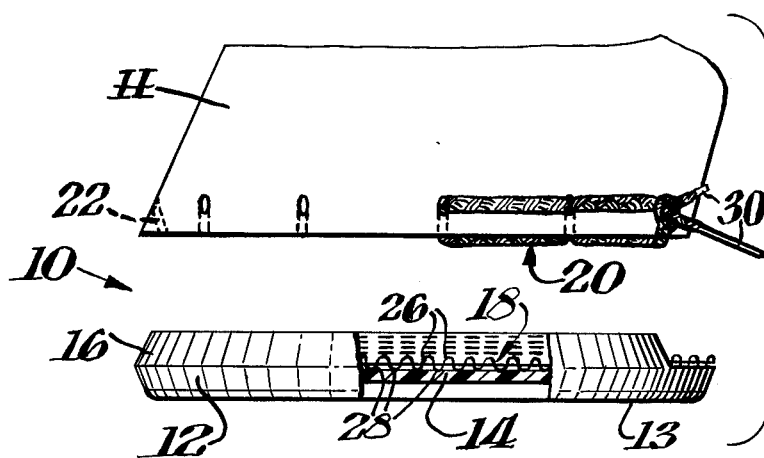
FIG. 4 is an exploded view of a horseshoe assembly employing the carrier sheet of FIGS. 1-2 and the lace of FIG. 3.

FIG. 4 illustrates a horseshoe assembly 10 comprising a body member 12 made from a suitable material such as adiprene. Body member 12 includes a lower wear surface 13 and an upper supporting or securing surface 14 and also includes upstanding side walls 16. As discussed in the prior descriptions it is difficult to adhere such plastic materials as adiprene directly to the horse's hoof. In accordance with this invention means are provided whereby a suitable adhesive may be anchored to the horseshoe assembly and then in turn to the hoof H. The mans include a pad 18 integrally secured as latter described to the body 12 and an elongated lace 20 threaded through holes 22 in the hoof.

In accordance with this prior descriptions the pad 18 may be disposed solely on the upper support surface 14 or against the side wall 16 or both the side walls and upper support surface. Similarly, the pad may take the form of individual pads at suitable spaced intervals or may be one continuous pad. FIG. 4 illustrates the preferred form of this invention wherein the pad is one continuous member in contact with both the upper supporting surface and the side walls 16.

As also described in the prior descriptions it is desirable to form the pad from an intermediate barrier sheet having anchoring means on each side thereof so that the adhesive will be confined to each respective side of the barrier sheet and will interact with the anchoring means to thus provide an effective bond. This arrangement thus assures that the proper amount of adhesive will remain on its side of the barrier sheet. The present application is directed to advantageous structure for effectuating those teachings.

Figure 1:
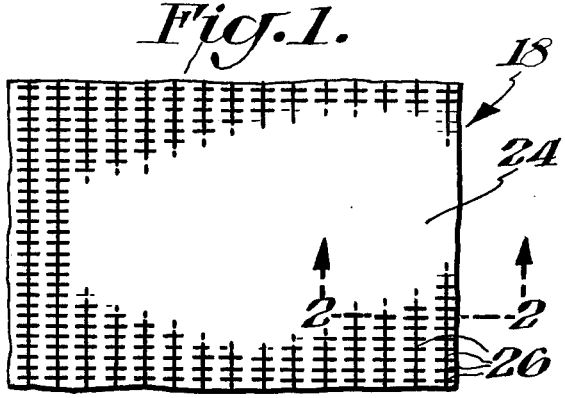
FIG. 1 is a top view of a carrier sheet usable in accordance with this invention.
Figure 2:
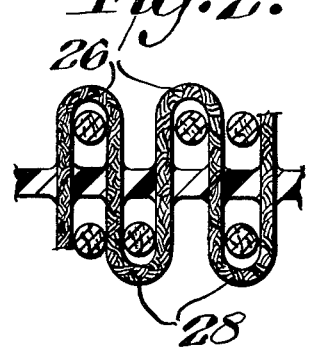
FIG. 2 is a cross-sectional view taken through FIG. 1 along the line 2—2.

FIG. 1 illustrates in plan view a suitable pad means 18 in accordance with this invention. As indicated therein, the carrier sheet 24 is made of an extensible material such as suitable polymer which can function as a barrier for the adhesives and which can conform to irregularities without wrinkles and preferably which is susceptible to heat treatment for sealing punctures therethrough which result from the incorporation of the anchoring means. The anchoring means is in the form of fibers connected directly to carrier sheet 24. Preferably the fibers are looped through the carrier sheet before molding as with the use of suitable multiple needle sewing machines so that loops 26, 28 are formed on each side thereof. As shown in FIGS. 1-2 the fibers extend both longitudinally and traversely across the carrier sheet. The crossed fibers are preferably napped to enhance their adhesive securement qualities. Suitable carrier sheet material includes thermo-forming plastics such as polymeric urethanes or neoprenes or also polyvinyl acetate and polyvinyl chloride which are from 1-100 mil thick. Such polymericlike materials include Corfam (registered trademark of E.I. du Pont de Nemours &

Co.). The fibers may be nylon fibers of mono or multiple filament type of ½ – 20 mil thickness. Where adiprene is selected as the material for body 12, the materials for the pad 24 should of course be selected so as to be compatible with the adiprene and the particular suitable adhesives being used. Thus, for example, the yarn or fibers should contain no oil finish.

After the fibers have pierced carrier sheet 24 to form the loops 26, 28 the assembly is heat treated to seal the punctures as illustrated in FIG. 2 thus rendering the carrier sheet 24 an effective barrier. If desired, the sealing may be accomplished by the use of latex as an after coating or conversely the latex itself may be applied as the sole sealant. Where sealing is accomplished by means of heat treatment a temperature of 150° F should be sufficient for that purpose. Where a latex is to be used as the sealant, a suitable material is Du Pont neoprene 671 Emulsion. The sealing of the openings or punctures in the barrier sheets not only assures its functioning as a barrier, but also locks the fibers in place. After the pad has been formed it is placed in the mold. The use of an extensible material permits the pad to be stretched so as to conform to any irregularities in shape without wrinkling. Liquid adiprene is then inserted in the mold and the resultant formed body member 12 becomes integrally attached to the loops on one side of the pad after curing. Desirably the crossed fibers 26, 28 are on both sides of the barrier but the invention may also be practiced with such crossed fibers 26 on only the remote side thereof.

Figure 3:
FIG. 3 is a plan view of a lace usable with this invention.

In accordance with this invention a particularly advantageous strand or lace structure is also provided. FIG. 3, for example, illustrates such lace 20. The material selected for the lace 20 is such that a balance is made between the yarn tensile strength and its adhesive absorption so that the resulting strand has a breaking point which should be less than the hoof H. In this manner if it is necessary to remove the shoe, the strand can be broken without pulling apart the horse's hoof and thus otherwise causing damage to the hoof. The fibers for pad 18 likewise have a breaking strength similar to lace 20.

In accordance with this invention the breaking strength of lace 20 has a maximum value of 1,000 lbs. Where the lace is formed of multiple strands the individual strands are selected to have the necessary strength per strand. Thus, for example, in a two strand construction, each strand would have a strength of 500 lbs. to result in a combined lace strength of 1,000 lbs. The lace is also selected to have a minimum a strength such as 20 lbs. so that it is strong enough to function in its intended manner. Suitable strand material includes Cordura (registered trademark of E. I. du Pont de Nemours) as well as Kevlar (poly amides), dacron, nylon, rayon or cotton having, for example, 10 grams per denier. The lace 20 may suitably be comprised of 6 strand 4,000 denier construction having a thickness of about 0.09 inches. The lace material should be absorptive, flexible, nontoxic and impervious and may be knitted, braided or flocked. The lace may have any suitable geometric shape such as being round, flat or oval in cross-section. The lace is also preferably napped to increase the adhesive penetration. Advantageously, at least one and preferably both ends of the lace have a pointed leveled hard tip construction 30. The tip 30 may be formed by fusing the ends of the material or by dipping the ends in epoxy and by applying a metal tube thereto. As illustrated in FIG. 3, the lace is of open construction having a series of accessible air spaces 34.

Figure 5:
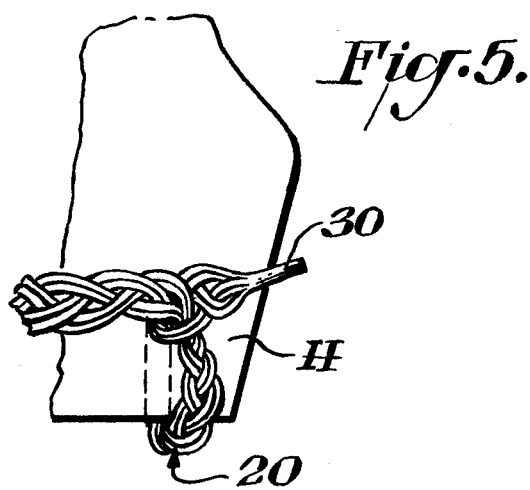
FIG. 5 is an elevation view of a portion of a horse's hoof illustrating means for fastening the lace of FIG. 3.
Figure 6:
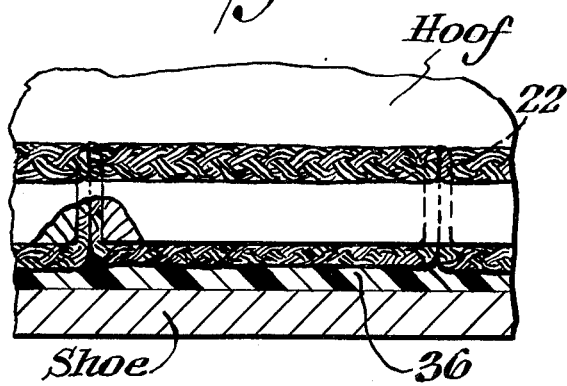
FIG. 6 is an elevation view partly broken away and in section illustrating the horseshoe assembly secured to a hoof.

FIG. 5 illustrates a manner of fastening lace 20 to the hoof H. As indicated therein, lace 20 is threaded through the holes in the hoof and then one of the tips 30 is inserted through a suitable opening 34 so that the ends of the lace can be tied together.

The lace is dimensioned with respect to the holes 22 in the hoof so as to substantially fill the holes and once adhesive is applied the adhesive is absorbed by the lace material and completely fill the holes. Sufficient adhesive 36 is used to completely saturate the portion of the lace which is disposed externally of the hoof.

In practice pad 18 is formed with loops 26, 28 disposed on both sides of carrier sheet 24 and carrier sheet 24 is secured to the adiprene body member by its integral attachment in the molding process. This would be done at the manufacturing site and the shoe would be stored for ultimate use. During such use the farrier threads lace 20 through pre-drilled holes in hoof H and fastens the lace thereto as previously described. A suitable adhesive is then applied to the upper or exposed portion of pad 18. The shoe is brought into contact with the hoof and the adhesive works its way into loops 26 and lace 20 so as to thereby mount the horseshoe assembly to the hoof.

The actual mechanics of securement may vary. For example, holes may be formed completely around the hoof in a U-shaped pattern with the lace threaded therethrough likewise in a U-shaped pattern. Conversely, the lace may be threaded only on opposite sides of the hoof and the holes at the bight would fill with adhesive or, if desired, holes may be completely omitted from the bight. It is therefore to be understood that, obviously the term U-shape is not limiting or intended to strictly mean such a shape but rather is used in its broad sense with respect to the general curvature of the hoof.

When it is necessary to remove the shoe this can be accomplished without damage thereto. A new horseshoe can later be applied and, when the removal is required for some premature purpose, the same pre-drilled holes can be used for the application of new lace material with the process being repeated. Otherwise when a new shoe is applied the hoof is trimmed, resulting in trimming the old holes and new holds must be drilled.

As indicated in parent application Ser. No. 614,766, a web portion may be connected to the shoe element to fill the space between the legs and bight of the U-shaped shoe element. To protect the sole of the hoof the web may be connected to the pad means and preferably is made from the same material as the pad means. The pad means may extend inwardly beyond and overhang the shoe element with the web then connected thereto. Such connection may be by means of interrengagement of projections on the web portion with projections on the surface of the pad means disposed toward the web. The lower surface of the web may have irregularities for providing a gripping surface thereof. Further the upper surface of the web may be molded to conform to the shape of the sole portion of the hoof.

What is claimed is:

1. A horseshoe assembly comprising a shoe element, said shoe element having a body member with a lower wear surface and an upper securing surface, adhesive means on said shoe element, hoof-threading means for being threaded through holes in a horse's hoof, said hoof threading means being in the form of a lace being flexible and non-toxic and absorbtive, said adhesive means being intimately secured to said lace, and said lace having a breaking strength less than the strength of the horse's hoof.

2. The assembly of claim 1 wherein said lace has a maximum strength of 1000 pounds.

3. The assembly of claim 2 wherein said lace has a minimum strength of 20 pounds.

4. The assembly of claim 3 wherein said lace is of multiple strand construction and includes a pointed hard-tipped formation at least one end thereof, and said lace being of open construction at each end remote from its end having said hard-tipped formation.

5. The assembly of claim 4 wherein said shoe element includes pad means secured to said upper securing surface, said pad means having an intermediate barrier sheet and anchoring means on each side thereof.

6. The assembly of claim 5 wherein said barrier sheet is made of an extensible material, said anchoring means comprising fibers extending through openings in said barrier sheet, and said barrier sheet openings being sealed to lock the fibers in place.

7. The assembly of claim 6 wherein said fibers form loops on each side of said barrier sheet, and said fibers are napped.

8. The assembly of claim 7 wherein said barrier sheet openings are sealed, and said fibers having a breaking strength less than that of the horse's hoof.

9. The assembly of claim 4 wherein said barrier sheet is a polymeric-like material.

10. The assembly of claim 4 wherein said barrier sheet is a polymeric-like material.

11. A horseshoe assembly comprising a shoe element, said shoe element having a body member with a lower wear surface and an upper securing surface, pad means mounted against said upper securing surface, said pad means comprising an intermediate barrier sheet and fibers secured to each side of said barrier sheet, said body member being intimately connected to the fibers on one side of said barrier sheet, said barrier sheet being made from an extensible material which is capable of being conformed to irregularities without wrinkling, said fibers extending through openings in said barrier sheet, and said openings being sealed.

12. The assembly of claim 11 wherein said fibers form loops on each side of said barrier sheet.

13. The assembly of claim 12 wherein said fibers are napped and are disposed longitudinally and traversely across at least one side of said barrier sheet.

14. The sheet of claim 11 wherein said fibers have a breaking strength less than that of the horse's hoof.

15. The assembly of claim 11 wherein said barrier sheet is a polymeric-like material.

16. A horseshoe assembly comprising a shoe element, said shoe element having a body member with a lower wear surface and an upper securing surface, said shoe element being generally U-shaped to conform to the shape of a hoof, adhesive means on said shoe element, hoof-threading means for being threaded through holes in a hoof of a horse, said hoof-threading means including an elongated strand made of a flexible lace-type material for being in direct contact with said adhesive means to thereby secure said assembly to the hoof, said strand being formed of an open material having a substantial number of exposed air spaces whereby the adhesive means may flow into said air spaces for intimate securement of said assembly to the hoof, said shoe element including a peripheral wall portion, pad means secured to said peripheral wall portion and said upper securing surface on one side thereof and secured to said adhesive means on other side thereof, said pad means including a sheet which extends from said peripheral wall portion and onto said upper securing surface, and a web portion connected to said pad means and filling the space between the legs and bight of said U-shaped shoe element to protect the sole of the hoof.

17. A horseshoe assembly comprising a shoe element, said shoe element having a body member with a lower wear surface and an upper securing surface, said shoe element being generally U-shaped, said shoe element having an upstanding peripheral side wall, said shoe element being made of a plastic material, pad means connected to upper securing surface of said shoe element and to the inner surface of said peripheral side wall, adhesive means secured to said pad means on the side thereof remote from said shoe element for securing said assembly to the hoof, said pad means including an impermeable sheet which comprises barrier means for preventing said adhesive from contacting said shoe element directly through said pad means, said sheet being a single continuous sheet which extends from said peripheral side wall and onto said upper securing surface, and a web member is connected to said pad means covering the area between the legs and bight portion of said U-shaped shoe element for shielding the sole of the hoof.

18. An assembly as set forth in claim 17 wherein said web is made from the same material as said pad means.

19. A horseshoe assembly comprising a shoe element, said shoe element having a body member with a lower wear surface and an upper securing surface, said shoe element being generally U-shaped, said shoe element being made of a plastic material, pad means connected to said upper securing surface of said shoe element, adhesive means secured to said pad means on the side thereof remote from said shoe element for securing said assembly to the hoof, and a web connected to said pad means covering the space between the legs and bight portion of said U-shaped member.

20. An assembly as set forth in claim 19 wherein said pad means extends inwardly beyond and overhangs said shoe element, and said web being connected to the overhanging portion of said pad means.

21. An assembly as set forth in claim 19 wherein said web has a lower surface disposed remote from the hoof, and said lower surface having exposed irregularities for providing a gripping surface thereof.

22. An assembly as set forth in claim 19 wherein said web has a non-planar upper surface molded to conform to the shape of the sole portion of the hoof.

23. An assembly as set forth in claim 19 wherein said pad means includes projections on its surface disposed toward said web, said web having projections on its surface disposed toward said pad means, and said projections on said pad means and on said web being interengaged to secure said pad means and web together.

* * * * *

UNITED STATES PATENT AND TRADEMARK OFFICE
CERTIFICATE OF CORRECTION

PATENT NO. : 4,036,302
DATED : July 19, 1977
INVENTOR(S) : Dudley W. C. Spencer

It is certified that error appears in the above-identified patent and that said Letters Patent are hereby corrected as shown below:

No. 76 "Skipley" should be --- Shipley ---

Col. 2, line 10, "parents" should be --- parent ---

Col. 2, line 25, "latter" should be --- later ---

Col. 2, line 25, "mans" should be --- means ---

Col. 2, line 28, "this" should be --- the ---

Col. 3, line 65, "leveled" should be --- beveled ---

Col. 3, line 51, delete "a" after --- minimum ---

Col. 4, line 55, "interrengagement" should be --- interengagement ---

Col. 5, line 11, insert "at" before --- at ---

Signed and Sealed this

First Day of November 1977

[SEAL]

Attest:

RUTH C. MASON
Attesting Officer

LUTRELLE F. PARKER
Acting Commissioner of Patents and Trademarks